Nov. 23, 1937.     A. H. OELKERS     2,099,822
WHEEL AND AXLE ASSEMBLY
Filed Oct. 9, 1933
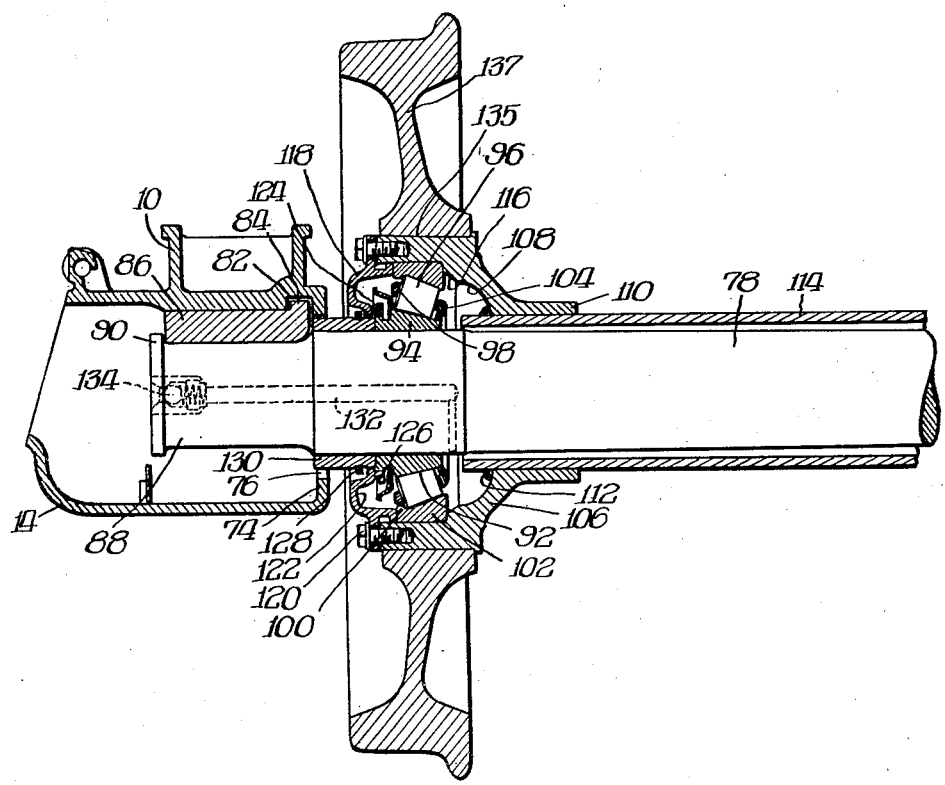
Inventor:
Alfred H. Oelkers, Patented Nov. 23, 1937

2,099,822

UNITED STATES PATENT OFFICE 2,099,822

WHEEL AND AXLE ASSEMBLY

Alfred H. Oelkers, Chicago, Ill., assignor to American Steel Foundries, Chicago, Ill., a corporation of New Jersey Application October 9, 1933, Serial No. 692,739

6 Claims. (Cl. 295—36)

The present invention relates to wheel and axle assemblies, and more in particular to the construction of the outer casing or axle therefor.

Among the objects of the present invention is to provide a novel construction for the casing or outer axle of wheel and axle assemblies so that the ordinary commercial tubing may be used without requiring machining or other hand work thereon.

Heretofore various designs for the outer casing or axle of wheel and axle assemblies have been used, but all of such designs have required extensive and expensive machining and hand work in order to fit the same for use. Furthermore, among the disadvantages of such a construction is the fact that the same cannot be used successfully where the wheel and axle assemblies are to be installed in freight cars which are handled over dumping machines for unloading, under which circumstances these wheel and axle assemblies are turned practically into a vertical position, which allows flow of lubricant from one end to the other whereby, when the axle again assumes normal position, too frequently the roller bearings will be lacking in sufficient amount of lubricant to properly lubricate the various parts.

Furthermore, in previous designs for wheel and axle assemblies the lubricant has not been effectively pumped or transferred through the moving parts of the roller bearings. It is therefore an object of the present invention to provide novel structure for the outer casing or axle of a wheel and axle assembly which includes, as an element in the construction thereof, a length of commercial tubing which is adapted without machining or hand work to be secured as by means of welding to end housings adapted to receive the wheels of the assembly.

Still another object of the present invention is to provide a structure for the casing or outer axle of a wheel and axle assembly which effectively retains the lubricant where the same is to be used, irrespective of whether or not this assembly is used in a freight car and therefore subject to movement from a horizontal to a vertical position.

Still a further object of the present invention is to provide a structure in a wheel and axle assembly which will properly direct and pump lubricant through the roller bearings.

Still another object is to provide a roller bearing wheel and axle assembly wherein a simplified outer housing is provided, the parts thereof being arranged to pump lubricant to the bearings in a plurality of directions.

With these and various other objects in view, the invention may consist of certain novel features of construction and operation as will be more fully described and particularly pointed out in the specification, drawing and claims appended hereto.

Referring to the drawing, the figure is an enlarged fragmentary sectional elevation through a wheel and axle assembly embodying the invention.

Referring now more in detail to the drawing, a wheel and axle assembly embodying improvements in accordance with the present invention is shown in association with a truck of the Simplex type including a single beam side frame 10 which may be substantially of box construction provided with a journal box 14 adjacent each end.

The journal box 14 applied to the truck constructions is generally similar to the standard A. R. A. type of journal box, except that the inner end thereof is provided with the wall 74 provided with the aperture 76 closely embracing shrink collar 130 on the inner axle 78 of the wheel and axle assembly shown in the figure adjacent the journal end thereof. The journal box is provided with the groove 82 in the roof thereof, said groove being adapted to receive a flange 84 of the brass 86. The brass 86 is seated on the journal end 88 of the inner axle 78, said axle being provided with the outer flange 90 defining the journal or the end of the axle. With this construction a short journal is provided whereby the center of the journal, or the center of the brass is located a minimum distance from the plane of the anti-friction bearings 92.

The anti-friction bearings are of any suitable construction such as the Simplex type, and include the inner race ring or cone 94 on which are seated the frusto-conical rollers 96, the axes thereof being disposed at an angle to the axis of the inner axle, said anti-friction bearings being provided with the outer frusto-conical thrust surface 98 adapted to have contact with the thrust shoulder 100 provided on the outer race ring or cup 102, the cage 104 being provided, preferably guided by the outer race ring. The outer race ring is press-fitted into the lubricant housing 106, said housing being provided with the cupped portion 108 terminating in the hub 110, said housing as shown being welded as at 112 to the outer axle or casing 114, said axle extending inwardly whereby the cupped portion 108 causes the lubricant to be directed toward the anti-friction bearings upon operation of the truck.

It will be noted that the outer axle casing 114 is of substantially uniform wall thickness throughout its entire length and the same is in the form of a tube or pipe which is commercially produced in large quantities at low cost. The bearing housings may be forgings or castings wherein the diameter of the opening in the hubs 110 is smaller than the outside diameter of the casing 114. In assembling the outer axle, the hubs 110 of the bearing housings are heated to comparatively high temperature, thereby expanding the same sufficiently to slip over the ends of the casing 114, the casing being at a lower or atmospheric temperature. By this method the hubs are shrunk onto the tube after which the hubs are locked in position by the welds 112 which have a diameter greater than the outside diameter of the casing 114 and which are disposed adjacent the outer end of the hubs 110.

The bearing recess 116 of the lubricant housing is adapted to be closed by means of the cover plate 118 secured thereto as at 120, the cover plate being also provided with the concave portion 122 to cause pumping of the lubricant toward the anti-friction bearings upon operation of the wheel and axle assembly. The cover plate is provided with the groove 124 for conducting lubricant toward the lower portion of the bearing recess when the truck is in inoperative position, and a deflector plate 126 is provided overlying the groove to prevent egress of liquid from the lubricant recess, and also to direct the lubricant toward the anti-friction bearings. A baffle ring 128 is provided to prevent ingress of dirt or grit, and also prevent egress of lubricant. This baffle ring is preferably provided on the shrink collar 130 disposed on the inner axle 78 for positioning the cone 94. Lubricant may be introduced to the lubricant recess through the channel 132 provided in the inner axle, the channel being preferably closed by means of a suitable fitting such as a spring-pressed ball 134. The housing 106 is further provided with a wheel hub portion 135 for the reception of the wheel 137 press-fitted thereon and being disposed so that the anti-friction bearings are disposed in the vertical plane of said wheel.

It will be noted that the ends of the casing 114 extending outwardly of the end of hubs 110 form lubricant cavities or reservoirs with the cupped portions 108 inwardly of the anti-friction bearings 92, which lubricant reservoirs are similar to the reservoirs formed by the concave portions 122 of the cover plates disposed outwardly of the bearings 92. These reservoirs serve to hold lubricant when the wheel and axle assembly is in abnormal positions and to prevent flow of lubricant from one bearing assembly to the other. This feature of construction is of importance where, for example, such assemblies are used in freight cars which are used with dumping machines which turn the cars practically upside down to discharge the contents.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. An axle for a wheel and axle assembly, comprising a centrally disposed tubular member, and a bearing housing disposed at each end of said member, each of said housings having a hub fitting over an end of said member, the ends of said tubular member extending outwardly of the outer end of said hubs.

2. An axle for a wheel and axle assembly, comprising a centrally disposed tubular member of substantially uniform wall thickness throughout its entire length, a bearing housing disposed at each end of said member, each of said housings having a hub fitting over an end of said member, the ends of said tubular member extending outwardly of the outer end of said hubs, and a weld of greater diameter than said tubular member and disposed on the outer surface thereof at the outer end of said hubs for securing said housings on said member.

3. An axle for a wheel and axle assembly, comprising a centrally disposed tubular member, and a bearing housing disposed at each end of said member, each of said housings having a hub fitting over an end of said member, said housings having a cupped portion disposed adjacent the hub thereof, the ends of said tubular member extending outwardly of the outer end of said hubs to provide lubricant reservoirs of said cupped portions.

4. An axle for a wheel and axle assembly, comprising a centrally disposed tubular member of substantially uniform wall thickness throughout its entire length, a bearing housing disposed at each end of said member, each of said housings having a hub fitting over an end of said member, said housings having a cupped portion disposed adjacent the hub thereof, the ends of said tubular member extending outwardly of the outer end of said hubs to provide lubricant reservoirs of said cupped portions, and a weld of greater diameter than said tubular member and disposed on the outer surface thereof at the outer end of said hubs for securing said housings to said member.

5. An axle for a wheel and axle assembly, comprising a centrally disposed tubular member, and bearing housings having hubs fitting over the ends of said tubular member, said tubular member having its ends extending outwardly beyond the hubs of said housings, and a weld joint between said hubs and member.

6. An axle for a wheel and axle assembly, comprising a centrally disposed tubular member, and bearing housings having hubs fitting over the ends of said tubular member, said tubular member having its ends extending outwardly beyond the hubs of said housings, and a weld joint between said member and the outer end of said hubs of greater diameter than said member.

ALFRED H. OELKERS.